United States Patent [19]

Yasukawa et al.

[11] Patent Number: 4,798,773

[45] Date of Patent: Jan. 17, 1989

[54] SOLID POLYMER ELECTROLYTE COMPOSITION

[75] Inventors: Eiki Yasukawa; Kunio Kihara; Mayumi Tsuboi, all of Ibaraki, Japan

[73] Assignee: Mitsubishi Petrochemical Co., Ltd., Tokyo, Japan

[21] Appl. No.: 122,918

[22] Filed: Nov. 19, 1987

[30] Foreign Application Priority Data

Nov. 21, 1986 [JP] Japan .................................. 61-278340
Nov. 21, 1986 [JP] Japan .................................. 61-278341
Dec. 4, 1986 [JP] Japan .................................. 61-289641

[51] Int. Cl.⁴ .............................................. H01M 6/16
[52] U.S. Cl. ...................................... 429/192; 252/62.2
[58] Field of Search ......................... 429/192; 252/62.2

[56]    References Cited
U.S. PATENT DOCUMENTS 4,230,549 10/1980 D'Agostino et al. ........... 429/192 X 4,556,616 12/1985 Armand et al. ...................... 429/192

FOREIGN PATENT DOCUMENTS 2164047 3/1986 United Kingdom ................ 429/192

OTHER PUBLICATIONS

International Symposium on Polymer Electrolytes, ISPE1, Jun. 87.

Primary Examiner—Brian E. Hearn
Assistant Examiner—Stephen J. Kalafut
Attorney, Agent, or Firm—Oblon, Fisher, Spivak, McClelland & Maier

[57]    ABSTRACT

A solid electrolyte composition having a high ion conductivity, comprising a monomer component and an electrolyte salt compound. This composition can suitably be used as electrolytes for solid electrolyte galvanic cells, ECD elements, etc.

12 Claims, No Drawings

SOLID POLYMER ELECTROLYTE COMPOSITION

FIELD OF THE INVENTION

This invention relates to a solid electrolyte composition having a high ion conductivity. More particularly, the invention relates to a novel solid polymer electrolyte composition which has high ion conductivity and transparency, can easily form a thin film thereof, and can be suitably used as electrolytes for solid electrolyte galvanic cells, electrochromic display (ECD) elements, etc.

BACKGROUND OF THE INVENTION

Since a conventional ion conductive material is usually prepared by dissolving an electrolyte in water or an organic solvent and is used as a solution form, there was the problem of liquid leakage. Therefore, for improving the liquid leakage resistance and developing solid electrolyte galvanic cells, ECD elements, etc., having high reliability, the development of a solid electrolyte having a high ion conductivity has been desired. For this reason, various investigations on the solidification of electrolytes have recently been made.

In the conventional solid electrolyte system using an inorganic substance, a high melting compound must be formed into a film in high vacuum by, for example, vacuum deposition method or sputtering method. Thus, there are the problem that the conventional system is difficult to mold and also the disadvantage that the conventional system has no flexibility.

On the other hand, as a solid electrolyte using an organic polymer which has an excellent film-forming ability and can easily form a thin film thereof, solid electrolytes comprising an organic polymer having added thereto an inorganic lithium salt are reported, for example, in Japanese Patent Application (OPI) Nos. 23003/84 and 31554/85 (the term "OPI" as used herein refers to a "published unexamined Japanese patent application"), Solid State Ionics, 2, 347 (1981), etc.

However, the solid electrolyte using the organic polymer as described above has a disadvantage that the ion conductivity thereof at room temperature is as low as $10^{-8}$ to $10^{-6}$ S.cm$^{-1}$.

Also, in the case of applying the solid electrolyte to a display element, particularly a transmissiontype ECD, it is an important element that the solid electrolyte is colorless and transparent.

SUMMARY OF THE INVENTION

As the result of various investigations to overcome the above-described problems, the inventors have discovered a polymer electrolyte composition as described below, which can be suitably used as electrolytes for solid electrolyte galvanic cells, ECD elements, etc.

Accordingly, one object of this invention is to provide a solid polymer electrolyte composition comprising a matrix polymer comprising at least one kind of a macromer represented by the following formula (I) as a monomer component, and an electrolyte salt compound:

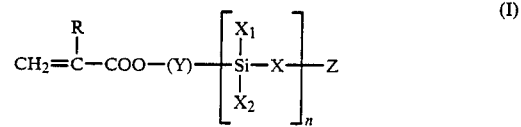

wherein
R represents a hydrogen atom or a methyl group;
Y represents a group represented by the formula

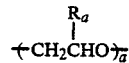

wherein $R_a$ represents a hydrogen atom or a methyl group and a represents 0 to 60;
X represents a divalent polyalkylene glycol residue represented by the formula

wherein $R_b$ represents a hydrogen atom or a methyl group and b represents 2 to 60;
$X_1$ and $X_2$ each represents a monovalent polyalkylene glycol compound residue represented by the formula

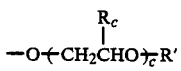

wherein $R_c$ represents a hydrogen atom or a methyl group, R' represents a hydogen atom, an alkyl group having 1 to 20 carbon atoms or an aryl group having 6 to 20 carbon atoms and c represents 2 to 60;
Z represents a hydrogen atom, an alkyl group having 1 to 20 carbon atoms, an aryl group having 6 to 20 carbon atoms, a monovalent group represented by the formula (II):

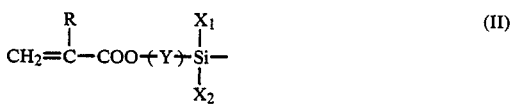

wherein R, Y, $X_1$ and $X_2$ are the same as defined above; or a monovalent group represented by the formula (III):

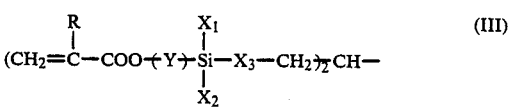

wherein R, Y, $X_1$ and $X_2$ are the same as defined above, and $X_3$ represents a group represented by the formula

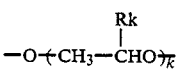

wherein $R_k$ represents a hydrogen atom or a methyl group and k represents 0 to 60; and n represents an integer of 1 to 3.

Another object of this invention is to provide a solid electrolyte composition comprising the abovedescribed solid polymer electrolyte composition and an aprotic organic solvent added thereto.

The solid polymer electrolyte composition of this invention shows a high ion conductivity at room temperature, can easily form a thin film thereof, and, in particular, can be suitably utilized as electrolytes for solid electrolyte galvanic cells and ECD elements.

The solid electrolyte of this invention has the features that the content of ethylene oxide or propylene oxide in the matrix polymer is high and the glass transition point of the matrix polymer is low. Accordingly, the concentration of the electrolyte salt in the matrix can be increased and further, since the low glass transition point of the solid electrolyte is effective to increase an ion mobility, a solid electrolyte showing a high ion conductivity is obtained.

Furthermore, since the matrix of the solid electrolyte can be swelled by addition of an aprotic organic solvent, which is very effective for ionic mobility, a solid electrolyte showing a very high ion conductivity is obtained by adding an aprotic organic solvent to the solid electrolyte.

DETAILED DESCRIPTION OF THE INVENTION

The matrix polymer which can be used in this invention is a polymer containing at least one kind of a macromer represented by the formula (I) described above as a monomer component.

The macromer represented by the formula (I) is produced from the compounds represented by the following formulae (IV) and (V), respectively, and tetrachlorosilane by conventional method:

$$\overset{R}{\underset{|}{CH_2=C}}-CO-O-(Y)-H \quad (IV)$$

$$HO \overset{R_m}{\underset{|}{+CH_2CHO}}_{\overline{m}}R' \quad (V)$$

wherein R, Y and R' are the same as defined above, $R_m$ represents a hydrogen atom or a methyl group, and m represents 2 to 60.

A silane compound such as tetrakisdimethylaminosilane, tetrakisdiethylaminosilane or tetraacetylsilane can be used in place of tetrachlorosilane.

Various kinds of macromers can be obtained according to the mol ratios of the above-described raw material compounds and the reaction method.

For example, by using 1 mole of a compound represented by the formula (IV) and 3 moles of a compound represented by a formula (V) to 1 mole of tetrachlorosilane, the macromer having the following formula is obtained.

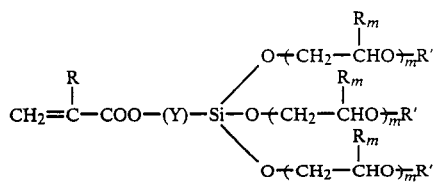

wherein R, $R_m$, R' and Y are the same as defined above.

As another method, the macromer represented by the formula (I) can be obtained by reacting a compound represented by the formula:

which is obtained by reacting 4 mols of glycol represented by the formula (V) as described above with 1 mol of tetrachlorosilane, with 1 mole of (meth)acrylic acid or (meth)acryloyl chloride.

Also, by using 1 mole of a compound represented by the formula (V) wherein R' is a hydrogen atom and 4 moles of a compound represented by the formula (V) wherein R' is an alkyl group or an aryl group in the above-described system together with 2 moles of tetrachlorosilane and 2 moles of (meth)acrylic acid or (meth)acryloyl chloride, a di(meth)acrylate macromer having the following formula can be obtained,

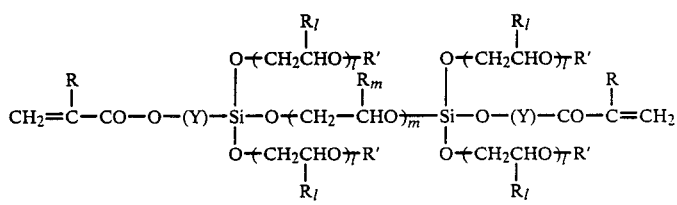

wherein R, $R_m$, R' and Y are the same as defined above, $R_l$ represents a hydrogen atom or a methyl group, and l represents 2 to 60.

Furthermore, by using a compound represented by the following formula (VI) in place of a part (1 mole) of the above-described compound represented by the formula (V) in the above-described system,

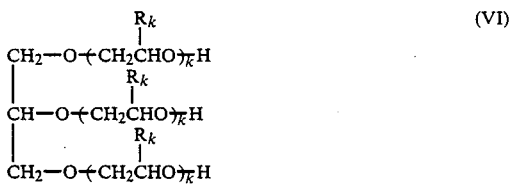

wherein $R_k$ represents a hydrogen atom or a methyl group and k represents from 0 to 60, a tri(meth)acrylate macromer having the following formula is obtained.

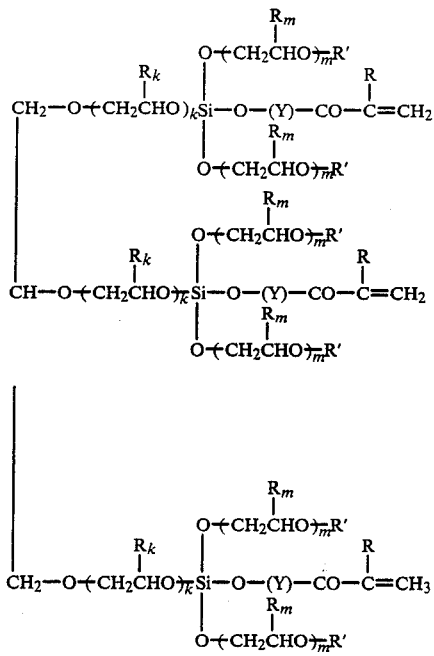

wherein R, $R_m$, $R_k$, R' and Y are the same as defined above.

Specific examples of the monomer represented by the formula (IV) described above are acrylic acid, methacrylic acid, 2-hydroxyethyl acrylate (HEA), 2-hydroxyethyl methacrylate (HEMA), 2-hydroxypropyl acrylate (HPA), 2-hydroxypropyl methacrylate (HPMA), 4-hydroxybutyl acrylate (HBA), 4-hydroxybutyl methacrylate (HBMA), polyalkylene glycol (meth)acrylates, etc.

Specific examples of the compound represented by the formula (V) described above are diethylene glycol, triethylene glycol, tetraethylene glycol, pentaethylene glycol, polyethylene glycol (average molecular weight: 200 to 2,000), diethylene glycol monomethyl ether, polyethylene glycol monomethyl ether (average molecular weight: 350 to 2,000), glycols such as a copolymer of ethylene oxide and propylene oxide, polyethylene glycol monodecyl ether, polyethylene glycol monocetyl ether, polyethylene glycol monooleyl ether, polyethylene glycol monophenyl ether, polyethylene glycol mono-p-nonylphenyl ether, polyethylene glycol mono-p-octyl ether, polypropylene glycol (average molecular weight: 400 to 3,000), dipropylene glycol monomethyl ether, polypropylene glycol monomethyl ether (average molecular weight: 400 to 3,000), etc.

Examples of the compound represented by the formula (VI) are glycerol, an ethylene oxide adduct of glycerol, etc.

When the average degree of polymerization of the polyalkylene glycol compound is less than 2, if the glass transition point of the matrix polymer obtained by polymerizing a macromer obtained is relatively high, a solid electrolyte having low concentration of dissolved salt is formed and thus a high ion conductivity is reluctant to obtain. On the other hand, when the average degree of polymerization is larger than 60, the polymerizability of the macromer obtained is poor and the matrix polymer tends to have poor film-forming ability and thin film-forming property.

The matrix polymer can be obtained by polymerizing the macromer represented by the formula (I) described above together with, if necessary, other polymerizable vinyl monomer which can be copolymerized with the macromer of the formula (I) using a polymerization initiator such as a peroxide, an azo compound, etc., or a light sensitizer, in the conventional manner.

There is no particular restriction about the above-described polymerizable vinyl monomer which can be copolymerized with the macromer represented by the formula (I). Representative examples thereof are (meth)acrylic acid alkyl ester, unsaturated nitriles such as (meth)acrylonitrile, etc.; aromatic olefins such as styrene, etc.; vinyl compounds such as vinyl chloride, vinyl acetate, etc.; N-vinyllactams such as N-vinylpyrrolidone, N-vinylpiperidone, etc.; (meth)acrylic acid; hydroxyalkyl (meth)acrylate such as (meth)acrylic acid hydroxyethyl ester, (meth)acrylic acid hydroxypropyl ester, etc.; (meth)acrylamide; mono(meth)acrylate of glycerol; polyethylene glycol mono(meth)acrylate; polyethylene glycol di(meth)acrylate; alkoxypolyethylene glycol mono(meth)acrylate; etc.

For sufficiently dissolving the electrolyte salt compound to obtain a high ion-conductivity in the matrix polymer, it is particularly preferred that the matrix polymer contains at least 50% by weight of the macromer represented by the formula (I).

As the electrolyte salt compound which is used as a combination with the matrix polymer in this invention, salts of metals belonging to group I and/or group II of the Periodic Table, aluminum salts, quaternary ammonium salts, quaternary phosphonium salts, etc., the salts having high solubility for the alkylene oxide in the matrix and having sparingly oxidoreductive property, are used. Particularly, at least one of $LiClO_4$, $LiBF_4$, $LiPF_6$, $LiAsF_6$, $LiCF_3SO_3$, $KPF_4$, KSCN, $NaPF_6$, $AlCl_3$, $AgClO_4$, $(C_2H_5)_4NBr$, $(C_4H_9)_4NClO_4$, $(C_4H_9)_4OBr$, etc., is used. Of those, inorganic lithium salts are generally used.

As to the amount of the electrolyte salt compound, it is preferred that the equivalent ratio of the alkylene oxide group in the matrix polymer to the electrolyte salt compound (alkylene oxide group/electrolyte salt compound) is from 4 to 200, more preferably from 6 to 80, to the equivalent of the alkylene oxide group, i.e., to the sum of the ethylene oxide equivalent and propylene oxide equivalent in the macrome R of the formula (I) or the macromer of the formula (I) and a copolymerizable monomer in the case of using the copolymerizable monomer having alkylene oxide group with the macromer of the formula (I). If the equivalent ratio is less than 4, it is difficult to uniformly dissolve the electrolyte salt compound and if the equivalent ratio is more than 200, it is difficult to obtain a high ion conductivity.

Also, in the solid polymer electrolyte composition of this invention, the matrix thereof can be swelled by adding thereto an organic solvent.

As the organic solvent which is used in this case, in the case of using an alkali metal salt as the electrolyte salt compound, an aprotic solvent stable to the alkali metal ion is suitable and for obtaining a high ion conductivity, an aprotic solvent having a high dielectric constant of at least 2 and preferably at least 4 at 25° C. is used. Examples of the aprotic organic solvent having a high dielectric constant are propylene carbonate, ethylene carbonate, γ-butyrolactone, sulforan, methylsulforan, dimethoxyethane, acetonitrile, dimethylformamide, tetrahydrofuran, graims, etc. These solvents can be used alone or as a mixture thereof.

For obtaining a transparent solid electrolyte having a high ion conductivity in this invention, the aprotic organic solvent is preferably used in an amount of from 80 to 1% by weight, more preferably from 70 to 5% by weight, based on the weight of the matrix polymer.

Production of Solid Electrolyte Composition

As a process for preparing the solid electrolyte composition of this invention, there is a process of obtaining a solid electrolyte composition by polymerizing the macromer represented by the formula (I) described above together with, if necessary, other polymerizable vinyl monomer in the presence of the above-described electrolyte salt compound and, if necessary, an aprotic organic solvent.

That is, the macromer represented by the formula (I) and, if necessary, other polymerizable monomer are dissolved in a solvent such as methanol, acetonitrile, tetrahydrofuran, toluene, water, etc., and an inorganic lithium salt is then added to the solution. Furthermore, a radical polymerization initiator such as benzyl peroxide, azobisbutyronitrile, 2,2'-azobis(2-amidinopropane), etc., is uniformly dissolved in the resulting mixture. The solution thus formed is formed into a film, etc., by a casting method or an injection molding method, and then the film, etc., is polymerized and the solvent is removed under heating to 40° C. to 80° C. to provide a thin film of a solid electrolyte composition.

Also, an aprotic organic solvent can be used as the organic solvent and the swelled matrix composition with the aprotic solvent can be used without removing the solvent.

In this case, in the weight composition ratio of the macromer represented by the formula (I) and other polymerizable vinyl monomer, it is preferred that the proportion of the macromer of the formula (I) is 50% by weight or more and the amount of the electrolyte salt is in the range that the equivalent ratio of alkylene oxide group to lithium (alkylene oxide/Li) is from 4 to 200 to the equivalent of the alkylene oxide group contained in the polymerizable vinyl monomer and the macromer of the formula (I).

In other production process for the solid electrolyte composition, there is a process of producing the solid electrolyte composition by previously polymerizing the macromer of the formula (I) and, if necessary, other polymerizable vinyl monomer to synthesize a matrix polymer and adding an organic solvent solution, in particular, an aprotic organic solvent solution of an electrolyte salt composition to the polymer thus synthesized.

That is, the macromer represented by the formula (I) and, if necessary, other polymerizable vinyl monomer are dissolved in a solvent such as methanol, acetone, acetonitrile, tetrahydrofuran, toluene, water, etc., conventional radical polymerization initiator such as benzoyl peroxide, azobisisobutyronitrile, 2,2'-azobis(2-amidinopropane), etc., is added to the solution thus formed, the mixture is stirred under heating for from 4 to 16 hours at from 40° C. to 80° C. in an inert gas atmosphere to provide a matrix polymer, and after forming a film of the matrix polymer thus obtained, the film of the matrix polymer is dipped in an organic solvent solution of the electrolyte salt composition to provide the thin film of the solid electrolyte composition. In the case that the organic solvent used is an aprotic solvent, it may be or may not be removed from the thin film.

The following examples are intended to illustrate the present invention but not to limit it in any way.

In addition, the ion conductivity was measured by the following manner.

After measuring the thickness of the film of a solid electrolyte composition as a sample by means of a micrometer, circular gold-plated measurement electrodes each having a diameter of 6 mm were closely applied to both surfaces of the film of the solid electrolyte composition, the whole assembly is placed in a nitrogen gas atmosphere kept at temperature of 25° C., an A.C. current of from $10^2$ Hz to $10^6$ Hz was applied to the electrodes by means of an LCR meter (4274A, 4275A, made by Yokogawa-Hewlett-Packard, Ltd.), and then the conductivity of the film was measured by a complex impedance method.

[PRODUCTION EXAMPLES OF MACROMER]

Production Example 1

In a four-necked flask were placed 180 ml of dehydrated toluene and 0.4 mol (68 g) of tetrachlorosilane, 0.1 mol (13.0 g) of 2-hydroxyethyl methacrylate (HEMA) was added dropwise to the mixture with stirring under ice-cooling, and after raising the temperature of the resulting mixture to 20° C., the reaction was conducted for 3 hours. After cooling the content in the flask to 5° C., excessive tetrachlorosilane was removed under reduced pressure of 5 Torr, after increasing the pressure in the flask to normal pressure with argon gas, a solution of 0.36 mol (126 g) of ethylene glycol monomethyl ether having an average molecular weight of 350 ($n \approx 8$) and 38 g of pyridine dissolved in 200 ml of dehydrated toluene was added dropwise to the reaction mixture and a reaction was further conducted for 4 hours at 25° C. After removing pyridine hydrochloride by filtration and distilling off toluene from the reaction mixture obtained, the reaction mixture was poured into 500 ml of hexane and the product obtained was separated. The product was then washed with a mixed solvent of hexane and ethyl ether and dried to provide a macromer having the following structural formula (Macromer 1). The macromer thus obtained was a colorless transparent liquid and the amount of the product obtained was 92 g.

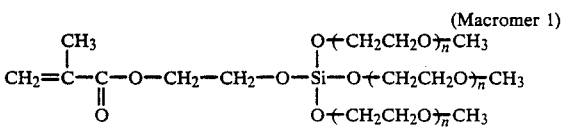
(Macromer 1)

The results of analyzing the product are as follows.

Infrared Absorption Spectral Characteristic Absorption Position: (NaCZ, unit cm$^{-1}$) 2880, 1720, 1640, 1460, 1350, 1320, 1300, 1250, 1150, 1100, 1040, and 950.

Proton Nuclear Magnetic Resonance Spectral Characteristic Absorption Position: (solvent: chloroform-α, unit δ(ppm))

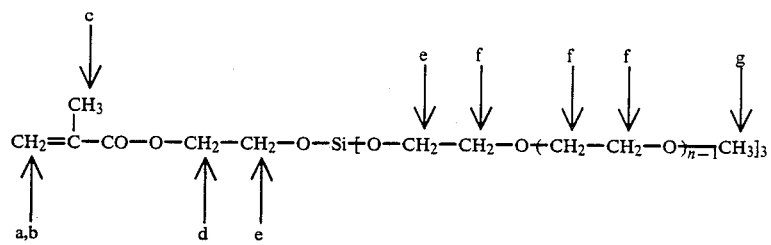

1.9 to 2.0 (H-c; m, 3H)
3.35 to 3.4 (H-g; m, 9H)
3.5 to 3.75 (H-f; m, 82H)
3.8 to 4.05 (H-e; m, 8H)
4.2 to 4.3 (H-d; m, 2H)
5.5 to 5.6 (H-a; m, 1H)
6.1 to 6.2 (H-b; m, 1H)
Elemental Analysis:

|  | C | H | Si |
|---|---|---|---|
| Calculated: | 52.2% | 8.7% | 2.3% |
| Found: | 51.5% | 8.5% | 2.2% |

From the results described above, it can be seen that the product obtained in Production Example 1 has the structure of the following formula.

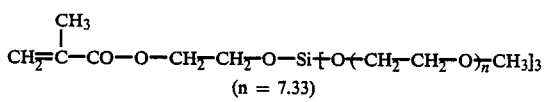

(n = 7.33)

Production Example 2

By following the same procedure as in Production Example 1 except that 0.1 mol (11.6 g) of 2-hydroxoyehtyl acrylate (HEA) was used in place of 2-hydroxyethyl methacryolate (HEMA) and also 0.36 mol (180 g) of polyethylene glycol monomethyl ether (PEGME) having an average molecular weight of 500 was used in place of polyethylene glycol monomethyl ether (PEGME) having an average molecular weight of 350, a macromer (Macromer 2) was obtained.

The macromer obtained was a colorless transparent liquid and the amount of the product obtained was 127 g. The results of analyzing the product are shown below.

Infrared Absorption Spectral Characteristic Absorption (Position: (NaCl, unit cm$^{-1}$) 2880, 1720, 1640, 1460, 1350, 1320, 1300, 1250, 1150, 1100, 1040, and 950.

Proton Nuclear Magnetic Resonance Spectral Characteristic Absorption Position: (solvent: chloroform-α, unit: δ(ppm),:

3.8 to 4.05 (H-e; m, 8H)
4.2 to 4.3 (H-d; m, 2H)
5.7 to 5.8 (H-a; m, 1H)
6.1 to 6.2 (H-c; m, 1H)
6.3 to 6.4 (H-b; m, 1H)
Elemental Analysis:

|  | C | H | Si |
|---|---|---|---|
| Calculated: | 52.5% | 8.8% | 1.8% |
| Found: | 51.7% | 8.6% | 1.7% |

From the results described above, it can be seen that the product obtained in Production Example 2 has the structure shown by the following formula:

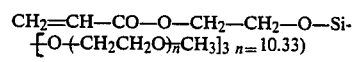

Production Example 3

By following the same procedure as in Production Example 1 except that 0.3 mol of polyethylene glycol monomethyl ether (PEGME) having an average molecular weight of 750 (n≈17) was used in place of polyethylene glycol monomethyl ether having an average molecular weight of 350 (n≈8), 190 g of a macromer (Macromer 3) was obtained.

Production Examples 4 TO 6

By following the same procedure as in Production Example 1 except that 0.1 mol of 2-hydroxyethyl acrylate (HEA), 2-hydroxypropyl acrylate (HPA) or 2-hydroxypropyl methacrylate (HPMA) was used in place of 2-hydroxyethyl methacrylate (HEMA), 82 g of a macromer (Macromer 4), 86 g of a macromer (Macromer 5) and 90 g of a macromer (Macromer 6) were obtained, respectively.

PRODUCTION EXAMPLE 7

In a four-necked flask were placed 180 ml of dehydrated toluene and 0.4 mol (68 g) of tetrachlorosilane and after adding dropwise 0.05 mol (30 g) of polyethylene glycol having an average molecular weight of 600 (m≈14) to the solution with stirring under ice-cooling,

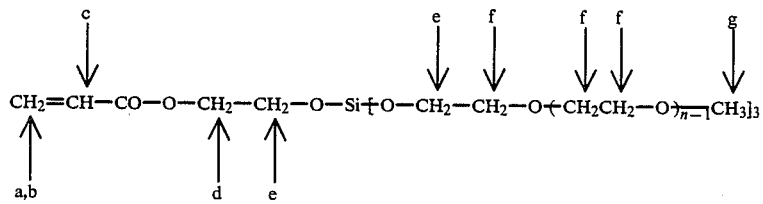

3.35 to 3.4 (H-g; m, 9H)
3.5 to 3.75 (H-f; m, 118H)

the temperature of the mixture was raised to 30° C. to conduct the reaction for 2 hours. After cooling the content in the flask to 5° C., excessive tetrachlorosilane was removed from the reaction mixture under reduced pressure of 1 Torr, a solution of 0.1 mol (13.0 g) of 2-hydroxyethyl methacrylate (HEMA) and 16 g of pyridine dissolved in 80 ml of dehydrated toluene was gradually added dropwise to the solution and a reaction was further conducted for 2 hours at 25° C. Thereafter, a solution of 0.24 mol (84 g) of polyethylene glycol monomethyl ether having an average molecular weight of 350 (n≈8) and 22 g of pyridine dissolved in 120 ml of dehydrated toluene was added dropwise to the reaction mixture and a reaction was further conducted for 4 hours at 25° C. to provide a macromer (Macromer 7) having the structure shown by the following formula. The macromer obtained was a colorless transparent liquid and the amount thereof was 96 g.

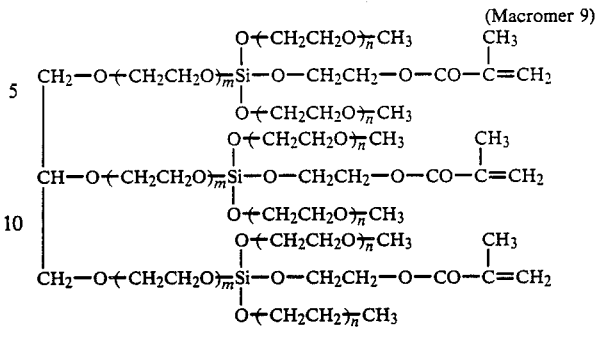
(Macromer 9)

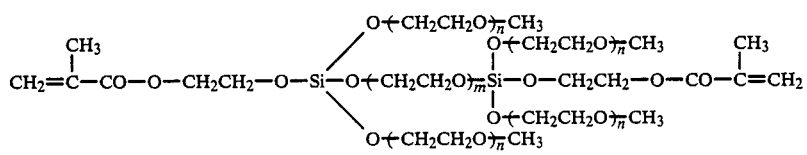
(Macromer 7)

Production Example 8

By following the same procedure as in Production Example 7 except that 0.05 mol of polyethylene glycol having an average molecular weight of 1,000 (m≈23) was used in place of polyethylene glycol having an average molecular weight of 600 (m≈14) and 0.2 mol of polyethylene glycol monomethyl ether (PEGME) having an average molecular weight of 550 (n≈13) was used in place of polyethylene glycol monomethyl ether having an average molecular weight of 350 (n≈8), a macromer (Macromer 8) was obtained.

Production Example 9

In a four-necked flask were placed 180 ml of dehydrated toluene and 0.4 mol (68 g) of tetrachlorosilane and after adding dropwise 0.01 mol (51 g) of an ethylene oxide (EO) adduct (m≈12) of glycerol to the solution with stirring under ice-cooling, the temperature of the system was raised to 30° C. to conduct the reaction for 2 hours.

After cooling the content in the flask to 5° C., excessive tetrachlorosilane was removed under reduced pressure of 1 Torr and after increasing the pressure in the flask to normal pressure with argon gas, a solution of 0.09 mol (11.7 g) of 2-hydroxyethyl methacrylate and 14 g of pyridine dissolved in 40 ml of dehydrated toluene was gradually added dropwise to the reaction mixture to further conduct a reaction for 2 hours at 25° C. A solution of 0.18 mol (63 g) of polyethylene glycol monomethyl ether having an average molecular weight of 350 (n≈8) and 20 g of pyridine dissolved in 160 ml of dehydrated toluene was added dropwise to the reaction mixture and a reaction was further conducted for 4 hours at 25° C. to provide 106 g of a macromer (Macromer 9) having the structure shown by the following formula.

The macromer obtained was a colorless transparent liquid.

Production Example 10

By following the same procedure as in Production Example 9 except that an ethylene oxide adduct (m≈17) of glycerol having an average molecular weight of 1,700 was used in place of the ethylene oxide adduct (m≈12) of glycerol having an average molecular weight of 1,700 and polyethylene glycol monomethyl ether having an average molecular weight of 550 (n≈13) was used in place of polyethylene glycol monomethyl ether having an average molecular weight of 350 (n≈8), a macromer (Macromer 10) was obtained.

EXAMPLE 1

After uniformly mixing a solution of 1.4 g of Macromer 1 obtained in Production Example 1, 0.4 g of polyethylene glycol dimethacrylate (PEGDM) as a polymerizable vinyl monomer, and 0.2 g of lithium perchlorate with a solution of 0.018 g of benzoyl peroxide dissolved in 0.5 ml of acetone, the mixture obtained was casted in a glass vessel having a diameter of 60 mm, the solvent was removed for 2 hours under reduced pressure and the monomers were polymerized for 20 hours under heating to provide a thin film of a solid electrolyte composition. The properties of the film are shown in Table 1 below.

EXAMPLE 2

By following the same procedure as in Example 1 except that Macromer 2 obtained in Production Example 2 was used in place of Macromer 1 in Example 1, a thin film of a solid electrolyte composition was obtained. The properties of the film are shown in Table 1 below.

EXAMPLES 3 TO 6

By following the same procedure as in Example 1 except that Macromer 3 obtained in Production Example 3, Macromer 4 obtained in Production Example 4, Macromer 5 obtained in Production Example 5, and Macromer 6 obtained in Production Example 6 each was used in place of Macromer 1 in Example 1, thin films of solid electrolyte compositions were obtained. The properties of these films are shown in Table 1 below.

EXAMPLES 7 TO 9

By following the same procedure as in Example 1 except that the weight composition ratio of Macaromer 1, polyethylene glycol dimethacrylate ($n \approx 23$), and lithium perchlorate (70/20/10) in Example 1 was changed to (90/0/10), (80/10/10), and (60/30/10), respectively, films of solid electrolyte compositions were obtained. The properties of the films obtained are shown in Table 1 below.

ple 5 was used in place of Macromer 1 used in Example 7, a thin film of a matrix polymer was obtained. Properties of the film obtained are shown in Table 2 below.

EXAMPLE 14

In a four-necked flask were placed 52 g of Macromer 1 obtained in Production Example 1, 13 g of methoxypolyethylene glycol methacrylate (n=9) as a polymerizable vinyl monomer, 0.33 g of azobisisobutyronitrile as also a polymerizable vinyl monomer and 200 g of

TABLE 1

| | | | | | | | | | |
|---|---|---|---|---|---|---|---|---|---|
| | | | Solid Polymer Electrolyte Composition | | | | | | |
| Example No. | A: Macromer | B: Copolymerizable Monomer | C: Electrolyte Salt | (A/B/C) Composition Ratio (wt %) | AO/Salt Equivalent Ratio | Film Thickness (mm) | Ion Conductivity (S/cm) | Tg (°C.) | Appearance |
| 1 | Macromer 1 (1.4 g) | PEGDM (0.4 g) | LiClO$_4$ (0.2 g) | 70/20/10 | 17.6 | 0.28 | $5.7 \times 10^{-5}$ | −66 | Colorless, transparent and soft film |
| 2 | Macromer 2 (1.4 g) | PEGDM (0.4 g) | LiClO$_4$ (0.2 g) | 70/20/10 | 18.6 | 0.29 | $1.1 \times 10^{-4}$ | −68 | Colorless, transparent and soft film |
| 3 | Macromer 3 (1.4 g) | PEGDM (0.4 g) | LiClO$_4$ (0.2 g) | 70/20/10 | 19.4 | 0.31 | $6.0 \times 10^{-5}$ | −58 | Colorless, transparent and soft film |
| 4 | Macromer 4 (1.4 g) | PEGDM (0.4 g) | LiClO$_4$ (0.2 g) | 70/20/10 | 17.8 | 0.32 | $9.8 \times 10^{-5}$ | −61 | Colorless, transparent and soft film |
| 5 | Macromer 5 (1.4 g) | PEGDM (0.4 g) | LiClO$_4$ (0.2 g) | 70/20/10 | 17.6 | 0.41 | $5.0 \times 10^{-5}$ | −60 | Colorless, transparent and soft film |
| 6 | Macromer 6 (1.4 g) | PEGDM (0.4 g) | LiClO$_4$ (0.2 g) | 70/20/10 | 17.5 | 0.38 | $1.7 \times 10^{-5}$ | −60 | Colorless, transparent and soft film |
| 7 | Macromer 1 (1.8 g) | — | LiClO$_4$ (0.2 g) | 90/0/10 | 17.3 | 0.42 | $6.0 \times 10^{-5}$ | −65 | Colorless, transparent and soft film |
| 8 | Macromer 1 (1.6 g) | PEGDM (0.2 g) | LiClO$_4$ (0.2 g) | 80/10/10 | 17.5 | 0.41 | $5.8 \times 10^{-5}$ | −64 | Colorless, transparent and soft film |
| 9 | Macromer 1 (1.2 g) | PEGDM (0.6 g) | LiClO$_4$ (0.2 g) | 60/30/10 | 17.8 | 0.31 | $2.0 \times 10^{-5}$ | −58 | Colorless, transparent and soft film |

PEGDM: Polyethylene Glycol Dimethacrylate (n = 23)
AO: Alkylene oxide group (hereinafter the same)

EXAMPLE 10

By following the same procedure as in Example 1 except that polyethylene glycol dimethacrylate (PEGDM) (n=4) was used in place of polyethylene glycol dimethacrylate (n=23) in Example 1, a thin film of a solid electrolyte composition was obtained. Properties of the film obtained are shown in Table 2 below.

EXAMPLES 11 AND 12

By following the same procedure as in Example 1 except that the weight composition ratio of Macromer 1, PEGDM (n=23), and lithium perchlorate (70/20/10) was changed to (77/20/3) and (55/20/25), respectively, films of solid electrolyte compositions were obtained. Properties of the films obtained are shown in Table 2 below.

EXAMPLE 13

By following the same procedure as in Example 7 except that Macromer 5 obtained in Production Examtoluene, and the resulting mixture was stirred under heating to 60° C. for 10 hours in a nitrogen gas atmosphere to provide a matrix polymer.

After uniformly dissolving 4.5 g of the matrix polymer and 0.5 g of lithium perchlorate in 20 g of N,N'-dimethylformamide, a part of the solution was casted on a glass plate of 8 cm×8 cm and dried for 20 hours under reduced pressure at 40° C. to 80° C. to provide a thin film of a solid electrolyte composition. Properties of the film obtained are shown in Table 2 below.

COMPARISON EXAMPLES 1 AND 2

By following the same procedure as in Example 1 except that an ethylene oxide unit (n=9) of methoxyethylene glycol methacrylate (MPEGM)(Comparison Example 1) and an ethylene oxide unit (n=4) of MPEGM (Comparison Example 2) each was used in place of Macromer 1 in Example 1, thin films of solid electrolyte compositions were obtained. Properties of the films obtained are shown in Table 2 below.

TABLE 2

| Example No. | A: Macromer | B: Copolymerizable Monomer | C: Electrolyte Salt | (A/B/C) Composition Ratio (wt %) | AO/Salt Equivalent Ratio | Film Thickness (mm) | Ion Conductivity (S/cm) | Tg (°C.) | Appearance |
|---|---|---|---|---|---|---|---|---|---|
| 10 | Macromer 1 (1.4 g) | PEGDM*2 (0.4 g) | LiClO$_4$ (0.2 g) | 70/20/10 | 16.0 | 0.26 | $1.3 \times 10^{-5}$ | −52 | Colorless, transparent and slightly soft film |
| 11 | Macromer 1 (1.54 g) | PEGDM*1 (0.4 g) | LiClO$_4$ (0.06 g) | 77/20/3 | 63.3 | 0.37 | $2.4 \times 10^{-5}$ | −71 | Colorless, transparent and soft film |
| 12 | Macromer 1 (1.1 g) | PEGDM*1 (0.4 g) | LiClO$_4$ (0.5 g) | 55/20/25 | 5.9 | 0.33 | $2.9 \times 10^{-5}$ | −61 | Colorless, transparent and soft film |
| 13 | Macromer 5 (4.5 g) | — | LiClO$_4$ (0.5 g) | 90/0/10 | 17.3 | 0.32 | $5.5 \times 10^{-5}$ | −63 | Colorless, transparent and soft film |
| 14 | Macromer 1 (3.6 g) | MPEGM*3 (0.9 g) | LiClO$_4$ (0.5 g) | 72/18/10 | 17.3 | 0.22 | $3.6 \times 10^{-5}$ | −62 | Colorless, transparent and soft film |
| Comparative Example 1 | MPEGM*3 (1.4 g) | PEGDM*1 (0.4 g) | LiClO$_4$ (0.2 g) | 70/20/10 | 17.7 | 0.35 | $9.2 \times 10^{-7}$ | −46 | Light yellow, transparent and slightly brittle film |
| Comparative Example 2 | MPEGM*4 (1.4 g) | PEGDM*1 (0.4 g) | LiClO$_4$ (0.2 g) | 70/20/10 | 15.0 | 0.38 | $3.9 \times 10^{-7}$ | −42 | Light yellow, transparent and slightly brittle film |

PEGDM*1: Polyethylene Glycol Dimethacrylate (n = 23)
PEGDM*2: Polyethylene Glycol Dimethacrylate (n = 4)
MPEGM*3: Methoxypolyethylene Glycol Methacrylate (n = 9)
MPEGM*4: Methoxypolyethylene Glycol Methacrylate (n = 4)

EXAMPLE 15

In a mixed solution of 1.44 g of Macromer 2 obtained in Production Example 2 and 0.36 g of propylene carbonate (PC) were uniformly dissolved 0.2 g of lithium perchlorate (LiClO$_4$) and 0.014 g of benzoyl peroxide as a polymerization initiator. The solution thus prepared was poured in a cell (a polyester film was used as the inside surface of the cell and a silicone sheet of 1.0 mm in thickness was used as spacer) made by a glass sheet and having a space of 2 cm in width, 5 cm in length and 1 mm in thickness, and was polymerized for 16 hours at 70° C. in a nitrogen gas atmosphere to provide a sheet-like solid electrolyte composition. The properties of the composition obtained are shown in Table 3 below.

EXAMPLE 16

By following the same procedure as in Example 15 except that the weight composition ratio of Macromer 2, the electrolyte salt compound and propylene carbonate (72/10/18) was changed to (54/10/36), a sheet-like solid electrolyte composition was obtained. Properties of the composition thus obtained are shown in Table 3 below.

EXAMPLES 17 AND 18

By following the same procedure as in Example 16 except that 0.72 g of 3-methylsulforan (MSLF) (Example 17) and 0.72 g of γ-butyrolactone (GBL) (Example 18) each was used in place of 0.72 g of propylene carbonate (PC), sheet-like solid electrolyte compositions were obtained. Properties of the compositions obtained are shown in Table 3 below.

COMPARISON EXAMPLE 3

By following the same procedure as in Example 16 except that an ethylene oxide unit (n=9) of methoxypolyethylene glycol methacrylate (MPEGM) was used in place of Macromer 2 in Example 16, a sheet-like semi-solid electrolyte composition was obtained. Properties of the sheet-like composition thus obtained are shown in Table 3 below.

TABLE 3

| Example No. | A: Macromer | B: Electrolyte Salt Compound | C: Organic Solvent | (A/B/C) Composition Ratio (wt %) | AO/Salt Equivalent Ratio | Film Thickness (mm) | Ion Conductivity (S/cm) | Appearance |
|---|---|---|---|---|---|---|---|---|
| 15 | Macromer 2 (1.44 g) | LiClO$_4$ (0.2 g) | PC*1 (0.36 g) | 72/10/18 | 14.8 | 0.87 | $8.8 \times 10^{-4}$ | Colorless, transparent and semi-solid film |
| 16 | Macromer 2 (1.08 g) | LiClO$_4$ (0.2 g) | PC*1 (0.72 g) | 54/10/36 | 10.4 | 0.85 | $1.8 \times 10^{-3}$ | Colorless, transparent and semi-solid film |
| 17 | Macromer 2 (1.08 g) | LiClO$_4$ (0.2 g) | MSLF*2 (0.72 g) | 54/10/36 | 10.4 | 0.94 | $8.2 \times 10^{-4}$ | Colorless, transparent and semi-solid film |
| 18 | Macromer 2 (1.08 g) | LiClO$_4$ (0.2 g) | GBL*3 (0.72 g) | 54/10/36 | 10.4 | 0.86 | $9.8 \times 10^{-4}$ | Colorless, transparent and semi-solid film |
| Comparative Example 3 | MPEGM*4 (1.08 g) | LiClO$_4$ (0.2 g) | PC*1 (0.72 g) | 54/10/36 | 10.4 | 0.88 | $2.8 \times 10^{-5}$ | Light yellow, transparent and semi-solid film |

PC*1: Propylene Carbonate
MSLF*2: 3-Methylsulforan
GBL*3: γ-Butyrolactone
MPEGM*4: Methoxypolythylene Glycol Methacrylate (n = 9)

EXAMPLE 19

After uniformly mixing a solution of 1.2 g of Macromer 7 obtained in Production Example 7, 0.6 g of methoxypolyethylene glycol methacrylate (MPEGM) (n=23) as a polymerizable vinyl monomer and 0.2 g of lithium perchlorate dissolved in 1 ml of methanol and a solution of 0.018 g of benzoyl peroxide dissolved in 0.5 ml of acetone, the solution prepared was casted in a glass vessel having a diameter of 60 mm and polymerized under heating to 60° C. for 20 hours while removing the solvent under reduced pressure for 2 hours at 40° C. to provide a thin film of a solid electrolyte composition. Properties of the film thus obtained are shown in Table 4 below.

EXAMPLE 20

By following the same procedure as in Example 19 except that Macromer 8 obtained in Production Example 8 was used in place of Macromer 7 in Example 19, a thin film of a solid electrolyte composition was obtained. Properties of the film are shown in Table 4 below.

EXAMPLES 21 AND 23

By following the same procedure as in Example 19 except that lithium borofluoride ($LiBF_4$) (Example 21) and lithium trifluoromethanesulfonate ($LiCF_3SO_3$) (Example 23) each was used in place of lithium perchlorate in Example 19, thin films of solid electrolyte compositions were obtained. Properties of the films obtained are shown in Table 4 below.

EXAMPLE 24

After uniformly mixing a solution of 0.30 g of Macromer 9 obtained in Production Example 9, 1.05 g of Macromer 1 obtained in Production Example 1 and 0.15 g of lithium perchlorate dissolved in 1 ml of methanol and a solution of 0.0135 g of benzoyl peroxide dissolved in 0.5 ml of acetone, the solution obtained was casted in a glass vessel having a diameter of 60 mm and was polymerized under heating to 60° C. for 20 hours while removing the solvent under reduced pressure for 2 hours at 40° C. to provide a thin film of a solid electrolyte composition. Properties of the film obtained are shown in Table 5 below.

EXAMPLE 25

By following the same procedure as in Example 24 except that Macromer 2 obtained in Production Example 2 was used in place of Macromer 1 in Example 24, a thin film of a solid electrolyte composition was obtained. Properties of the film obtained are shown in Table 5 below.

EXAMPLE 26

By following the same procedure as in Example 24 except that Macromer 10 obtained in Production Example 10 was used in place of Macromer 9 in Example 24, a thin film of a solid electrolyte composition was obtained. Properties of the film are shown in Table 5 below.

EXAMPLE 27

By following the same procedure as in Example 24 except that methoxypolyethylene glycol methacrylate (MPEGM) (n=23) was used in place of Macromer 1 in Example 24, a thin film of a solid electrolyte composition was obtained. Properties of the film are shown in Table 5 below.

EXAMPLE 28

By following the same procedure as in Example 24 except that Macromer 10 obtained in Production Example 10 and methoxypolyethylene glycol methacrylate (n=9) were used in place of Macromer 1 and Macromer 9 in Example 28, a thin film of a solid electrolyte composition was obtained. Properties of the film obtained are shown in Table 5 below.

TABLE 4

Solid Polymer Electrolyte Composition

| Example No. | A: Macromer | B: Copolymerizable Monomer | C: Electrolyte Salt | (A/B/C) Composition Ratio (wt %) | AO/Salt Equivalent Ratio | Film Thickness (mm) | Ion Conductivity (S/cm) | Tg (°C.) | Appearance |
|---|---|---|---|---|---|---|---|---|---|
| 19 | Macromer 7 (1.2 g) | MPEGM*[1] (0.6 g) | $LiClO_4$ (0.2 g) | 60/30/10 | 18.3 | 0.31 | $5.1 \times 10^{-5}$ | −61 | Colorless, transparent and soft film |
| 20 | Macromer 8 (1.2 g) | MPEGM*[1] (0.6 g) | $LiClO_4$ (0.2 g) | 60/30/10 | 19.2 | 0.32 | $9.4 \times 10^{-5}$ | −66 | Colorless, transparent and soft film |
| 21 | Macromer 7 (1.2 g) | MPEGM*[1] (0.6 g) | $LiBF_4$ (0.2 g) | 60/30/10 | 16.1 | 0.25 | $7.5 \times 10^{-5}$ | −64 | Colorless, transparent and soft film |
| 22 | Macromer 7 (1.2 g) | MPEGM*[1] (0.6 g) | $LiPF_6$ (0.2 g) | 60/30/10 | 26.1 | 0.26 | $6.7 \times 10^{-5}$ | −63 | Colorless, transparent and soft film |
| 23 | Macromer 7 (1.2 g) | MPEGM*[1] (0.6 g) | $LiCF_3SO_3$ (0.2 g) | 60/30/10 | 26.8 | 0.28 | $7.1 \times 10^{-5}$ | −64 | Colorless, transparent and soft film |

MPEGM*[1]: Methoxypolyethylene Glycol Methacrylate (n = 23)

TABLE 5

Solid Polymer Electrolyte Composition

| Example No. | A: Macromer | B: Copolymerizable Monomer | C: Electrolyte Salt | (A/B/C) Composition Ratio (wt %) | AO/Salt Equivalent Ratio | Film Thickness (mm) | Ion Conductivity (S/cm) | Tg (°C.) | Appearance |
|---|---|---|---|---|---|---|---|---|---|
| 24 | Macromer 9 (0.30 g) | Macromer 1 (1.05 g) | $LiClO_4$ (0.15 g) | 20/70/10 | 17.5 | 0.25 | $1.1 \times 10^{-4}$ | −64 | Colorless, transparent |

TABLE 5-continued

| | | | Solid Polymer Electrolyte Composition | | | | | |
|---|---|---|---|---|---|---|---|---|
| Example No. | A: Macromer | B: Copolymerizable Monomer | C: Electrolyte Salt | (A/B/C) Composition Ratio (wt %) | AO/Salt Equivalent Ratio | Film Thickness (mm) | Ion Conductivity (S/cm) | Tg (°C.) | Appearance |
| 25 | Macromer 9 (0.30 g) | Macromer 2 (1.05 g) | LiClO$_4$ (0.15 g) | 20/70/10 | 18.5 | 0.25 | $1.1 \times 10^{-4}$ | −64 | and soft film Colorless, transparent and soft film |
| 26 | Macromer 10 (0.30 g) | Macromer 1 (1.05 g) | LiClO$_4$ (0.15 g) | 20/70/10 | 17.6 | 0.24 | $9.3 \times 10^{-5}$ | −66 | Colorless, transparent and soft film |
| 27 | Macromer 9 (0.45 g) | MPEGM*$^1$ (0.90 g) | LiClO$_4$ (0.15 g) | 30/60/10 | 19.2 | 0.23 | $1.8 \times 10^{-5}$ | −57 | Light yellow, transparent and slightly hard film |
| 28 | Macromer 10 (0.45 g) | MPEGM*$^2$ (0.90 g) | LiClO$_4$ (0.15 g) | 30/60/10 | 18.0 | 0.23 | $1.6 \times 10^{-5}$ | −55 | Light yellow, transparent and slightly hard film |

MPEGM*$^1$: Methoxypolyethylene Glycol Methacrylate (n = 23)
MPEGM*$^2$: Methoxypolyethylene Glycol Methacrylate (n = 9)

As is clear from the results shown in Tables 1 to 5 described above, it can be seen that the solid electrolyte compositions of this invention have high ion conductivity of at least $10^{-5}$ (S·cm$^{-1}$) at room temperature (25° C.) and are colorless and transparent electrolyte materials showing sufficiently high ion conductivity at room temperature and having excellent thin film-forming property.

Accordingly, the solid electrolyte composition of this invention can be sufficiently applied as electrolytes for, in particular, solid electrolyte galvanic cells and electrochromic display (ECD) elements.

While the invention has been described in detail and with reference to specific embodiments thereof, it will be apparent to one skilled in the art that various changes and modifications can be made therein without departing from the spirit and scope thereof.

What is claimed is:

1. A solid polymer electrolyte composition comprising a matrix polymer comprising at least one kind of a macromer represented by the following formula (I) as a monomer component, and an electrolyte salt compound:

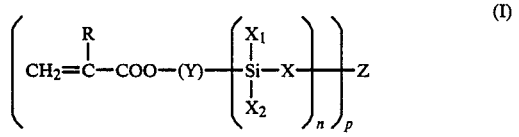

wherein:
R represents a hydrogen atom or a methyl group;
Y represents a group represented by the formula

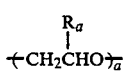

wherein R$_a$ represents a hydrogen atom or a methyl group and a represents 0 to 60;
X represents a divalent polyene glycol residue represented by the formula

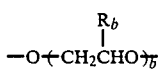

wherein R$_b$ represents a hydrogen atom or a methyl group and b represents 2 to 60;
X$_1$ and X$_2$ each represents a monovalent polyalkylene glycol compound residue represented by the formula

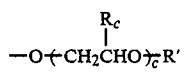

wherein R$_c$ represents a hydrogen atom or a methyl group, R' represents a hydrogen atom, an alkyl group having 1 to 20 carbon atoms or an aryl group having 6 to 20 carbon atoms and c represents 2 to 60;
Z represents a hydrogen atom, a monovalent alkyl group having 1 to 20 carbon atoms, an aryl group having 6 to 20 carbon atoms, or a polyvalent alkyl group selected from ethylene, methyl ethylene and 1,2,3-propanetriyl residue, and
n and p each represents an integer of 1 to 3.

2. The solid polymer electrolyte composition as claimed in claim 1, wherein the proportion of the matrix copolymer and the electrolyte salt compound is such that the equivalent ratio of the alkylene oxide group in the matrix polymer to one equivalent of the electrolyte salt compound is in the range of from 4 to 200.

3. The solid polymer electrolyte composition as claimed in claim 1, wherein the matrix polymer is a polymer obtained by polymerizing 50% by weight or more of the macromer component and 50% by weight or less of a vinyl monomer copolymerizable with the macromer represented by the formula (I).

4. The solid polymer electrolyte composition as claimed in claim 1, wherein the electrolyte salt compound is selected from salts of metals belonging to group I or group II of the Periodic Table, aluminum salts, quaternary ammonium salts, and quaternary phosphonium salts.

5. The solid polymer electrolyte composition as claimed in claim 1, wherein the electrolyte salt is at least one selected from the group consisting of LiClO$_4$, LiBF$_4$, LiPF$_6$, LiAsF$_6$, LiCF$_3$SO$_3$, KPF$_4$, KSCN, NaPF$_6$, AlCl$_3$, AgClO$_4$, (C$_2$H$_5$)$_4$NBr, (C$_4$H$_9$)$_4$NClO$_4$ and (C$_4$H$_9$)$_4$OBr.

6. The solid polymer electrolyte composition as claimed in claim 4, wherein the electolyte salt compound is an inorganic lithium salt.

7. The solid polymer electrolyte composition as claimed in claim 3, wherein the macromer is represented by the formula:

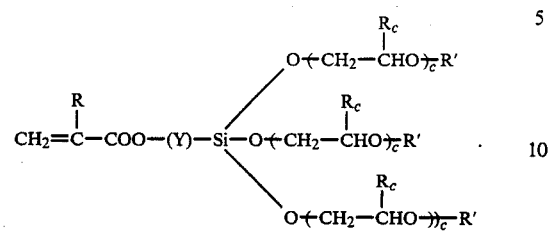

wherein R, $R_c$, R' and Y are the same as defined above.

8. The solid polymer electrolyte composition as claimed in claim 1, wherein the macromer is represented by the formula:

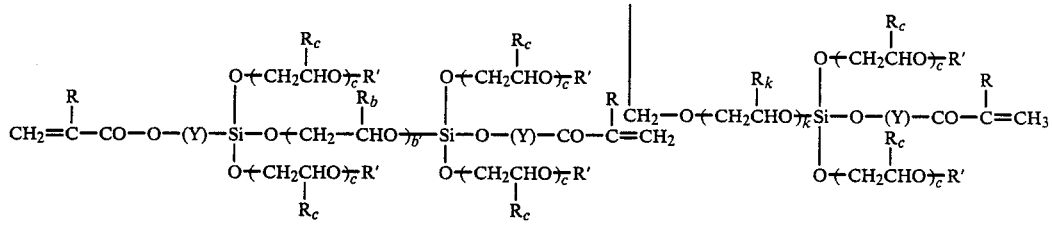

wherein R, $R_b$, $R_c$, R' and Y are the same as defined above, and b' represents 5 to 60.

9. The solid polymer electrolyte composition as claimed in claim 1, wherein the macromer is represented by the formula:

wherein R, $R_c$, $R_k$, R' and Y are the same as defined above.

10. The solid polymer electrolyte composition as claimed in claim 1, further comprising an aprotic organic solvent.

11. The solid polymer electrolyte composition as claimed in claim 10, wherein the aprotic organic solvent has a dielectric constant of at least 2 at 25° C.

12. The solid polymer electrolyte composition as claimed in claim 10, wherein the content of the aprotic organic solvent is 80% by weight or less based on the weight of the matrix polymer.

* * * * *